US012132281B2

(12) United States Patent
Oosaka

(10) Patent No.: US 12,132,281 B2
(45) Date of Patent: Oct. 29, 2024

(54) CONNECTOR AND A MATING CONNECTOR WITH RESPECTIVE SHEILD PORTIONS

(71) Applicant: JAPAN AVIATION ELECTRONICS INDUSTRY, LIMITED, Tokyo (JP)

(72) Inventor: Junji Oosaka, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 352 days.

(21) Appl. No.: 17/705,865

(22) Filed: Mar. 28, 2022

(65) Prior Publication Data

US 2022/0368080 A1 Nov. 17, 2022

(30) Foreign Application Priority Data

May 17, 2021 (JP) ................................ 2021-082870

(51) Int. Cl.
*H01R 12/71* (2011.01)
*H01R 13/6582* (2011.01)

(52) U.S. Cl.
CPC ....... *H01R 13/6582* (2013.01); *H01R 12/716* (2013.01)

(58) Field of Classification Search
CPC .................................... H01R 13/6582–12/716
See application file for complete search history.

(56) References Cited

U.S. PATENT DOCUMENTS 6,533,614 B1 * 3/2003 Akama .............. H01R 13/6585 439/607.05
10,249,969 B2 * 4/2019 Ono ..................... H01R 13/504
10,910,745 B2 * 2/2021 Hosoda ................ H01R 12/716
(Continued)

FOREIGN PATENT DOCUMENTS

CN 211126218 U 7/2020
CN 212485720 U 2/2021
(Continued)

OTHER PUBLICATIONS

Taiwanese Office Action (and an English language translation thereof) dated Feb. 3, 2023, issued in counterpart Taiwanese Application No. 111110511.
(Continued)

*Primary Examiner* — Vanessa Girardi
(74) *Attorney, Agent, or Firm* — Holtz, Holtz & Volek PC

(57) ABSTRACT

A connector assembly comprises a connector and a mating connector mateable with each other. The connector comprises a first terminal, a second terminal and a shield portion. The shield portion is located between the first terminal and the second terminal in the pitch direction. The mating connector comprises a first mating terminal, a second mating terminal and a mating shield portion. The mating shield portion is located between the first mating terminal and the second mating terminal in the pitch direction. One of the shield portion and the mating shield portion has a plate portion, and a remaining one of the shield portion and the mating shield portion has a mating plate portion. Under the mated state, a position of the plate portion in the pitch direction is equal to or overlaps with another position of the mating plate portion in the pitch direction.

7 Claims, 8 Drawing Sheets

(56) References Cited

U.S. PATENT DOCUMENTS

| | | | | |
|---|---|---|---|---|
| 11,011,874 | B2 * | 5/2021 | Kitazawa | H01R 12/716 |
| 11,101,605 | B2 * | 8/2021 | Zhang | H01R 13/659 |
| 11,469,538 | B2 * | 10/2022 | Oosaka | H01R 13/518 |
| 11,527,847 | B2 * | 12/2022 | Oosaka | H01R 13/502 |
| 11,532,904 | B2 * | 12/2022 | Amemori | H01R 12/716 |
| 11,804,676 | B2 * | 10/2023 | Amemori | H01R 12/73 |
| 2018/0151992 | A1 | 5/2018 | Zhao | |
| 2021/0111521 | A1 | 4/2021 | Amemori et al. | |

FOREIGN PATENT DOCUMENTS

| | | | |
|---|---|---|---|
| JP | 6635242 | B1 | 12/2019 |
| JP | 3230774 | U | 2/2021 |
| KR | 20210016626 | A | 2/2021 |
| TW | M568511 | U | 10/2018 |

OTHER PUBLICATIONS

Korean Office Action (and English language translation) dated Mar. 8, 2024 in counterpart Korean Application No. 10-2022-0039949.

* cited by examiner

CONNECTOR AND A MATING CONNECTOR WITH RESPECTIVE SHEILD PORTIONS

CROSS REFERENCE TO RELATED APPLICATIONS

This application is based on and claims priority under 35 U.S.C. § 119 to Japanese Patent Application No. JP 2021-082870 filed May 17, 2021, the content of which is incorporated herein in its entirety by reference.

BACKGROUND OF THE INVENTION

This invention relates to a connector assembly comprising a connector and a mating connector mateable with each other.

For example, this type of connector assembly is disclosed in JPB 6635242 (Patent Document 1), the content of which is incorporated herein by reference.

Referring to FIG. 14, Patent Document 1 discloses a connector assembly 90 comprising a first connector (connector) 92 and a second connector (mating connector) 96 mateable with each other. The connector 92 comprises a first projecting terminal (first terminal) 922, a second projecting terminal (second terminal) 924 and a first partial wall terminal 928. The first partial wall terminal 928 is located between the first terminal 922 and the second terminal 924 in a pitch direction, or the X-direction in FIG. 14. The mating connector 96 comprises a first recessed terminal (first mating terminal) 962, a second recessed terminal (second mating terminal) 964 and a second partial wall terminal 968. The second partial wall terminal 968 is located between the first mating terminal 962 and the second mating terminal 964 in the pitch direction.

Under a mated state where the connector 92 and the mating connector 96 are mated with each other, the first terminal 922 and the first mating terminal 962 are brought into contact with each other to form a first engaged terminal for transmitting high-frequency signals. Under the mated state, the second terminal 924 and the second mating terminal 964 are brought into contact with each other to form a second engaged terminal. Under the mated state, the first partial wall terminal 928 and the second partial wall terminal 968 are brought into contact with each other in the pitch direction to form a wall terminal (see dashed line in FIG. 14) which is formed with no gap. The first engaged terminal and the second engaged terminal are securely separated from each other by the wall terminal so that the second engaged terminal is electro-magnetically shielded against high frequency wave radiated from the first engaged terminal.

As can be seen from FIG. 14, the wall terminal of Patent Document 1 tends to make the connector assembly 90 large in the pitch direction.

SUMMARY OF THE INVENTION

It is therefore an object of the present invention to provide a connector assembly having a structure which enables the connector assembly to have a small size in its pitch direction.

An aspect of the present invention provides a connector assembly comprising a connector and a mating connector. The connector and the mating connector are mateable with each other along an upper-lower direction. The connector comprises a housing, a first terminal, a second terminal and a shield portion. The housing has a holding portion. The holding portion holds the first terminal, the second terminal and the shield portion. The shield portion is located between the first terminal and the second terminal in a pitch direction perpendicular to the upper-lower direction. The mating connector comprises a first mating terminal, a second mating terminal and a mating shield portion. The mating shield portion is located between the first mating terminal and the second mating terminal in the pitch direction. Under a mated state where the connector and the mating connector are mated with each other, the first terminal and the first mating terminal are connected to each other, and the second terminal and the second mating terminal are connected to each other. One of the shield portion and the mating shield portion has a plate portion, and a remaining one of the shield portion and the mating shield portion has a mating plate portion. At least the plate portion has a projection. The projection projects in a lateral direction perpendicular to both the upper-lower direction and the pitch direction. Under the mated state, a position of the plate portion in the pitch direction is equal to or overlaps with another position of the mating plate portion in the pitch direction, and the projection is in contact with the mating plate portion in the lateral direction. The shield portion has an armor. The armor projects outward from the holding portion in the lateral direction. The armor extends upward to a position which is same as or above a position of an upper end of the first terminal and which is same as or above a position of an upper end of the second terminal.

According to an aspect of the present invention, under the mated state, a position of the plate portion, which is provided to one of the shield portion and the mating shield portion, is equal to or overlaps with another position of the mating plate portion, which is provided to a remaining one of the shield portion and the mating shield portion, in the pitch direction. This structure enables the connector assembly to have an electro-magnetic shield function while the connector assembly has a reduced size in the pitch direction. Thus, the present invention provides a connector assembly having a structure which enables the connector assembly to have a small size in the pitch direction.

The armor of an aspect of the present invention projects outward from the holding portion of the housing in the lateral direction and extends in the upper-lower direction to have a height equal to or higher than those of the first terminal and the second terminal. The thus-formed armor can protect the housing, the first terminal and the second terminal so that the housing, the first terminal and the second terminal are not damaged during a mating operation.

An appreciation of the objectives of the present invention and a more complete understanding of its structure may be had by studying the following description of the preferred embodiment and by referring to the accompanying drawings.

Figure 1:
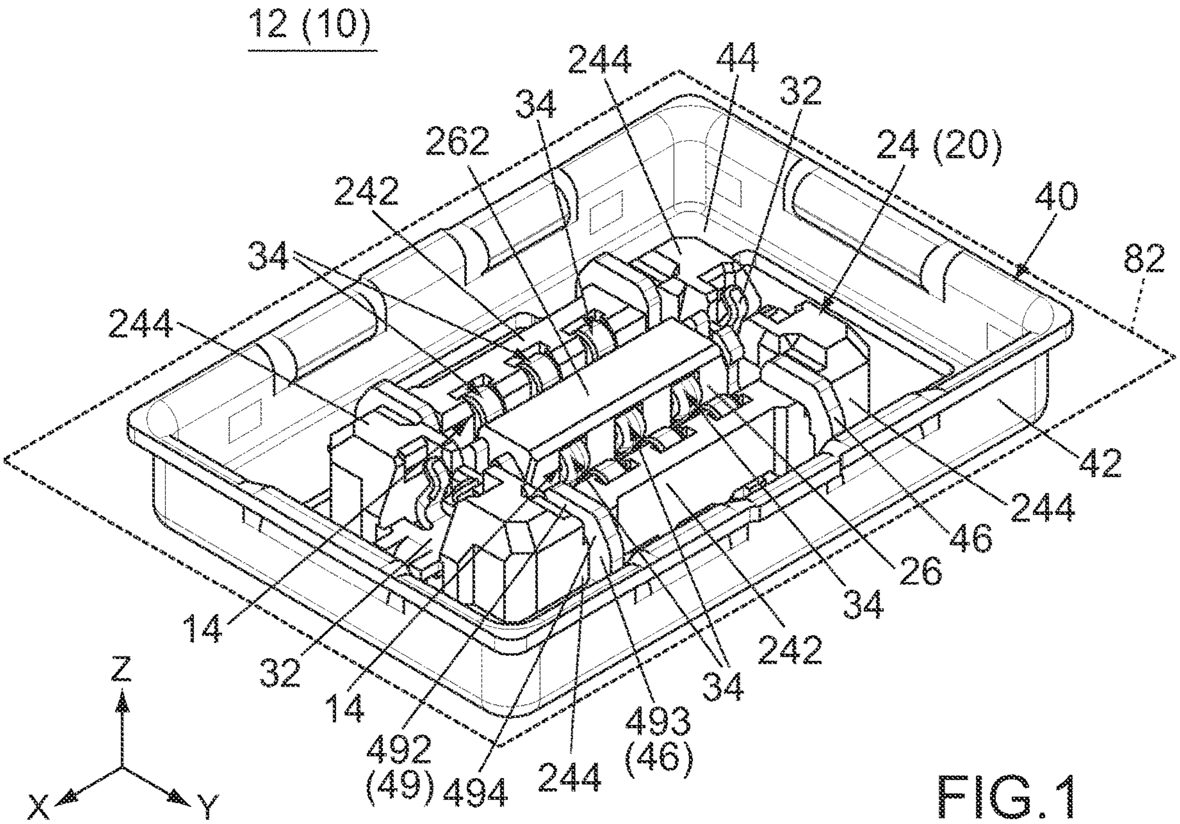
FIG. 1 is a perspective view showing a connector of a connector assembly according to an embodiment of the present invention, wherein an outline of a part of a circuit board on which the connector is mounted is illustrated with dashed line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
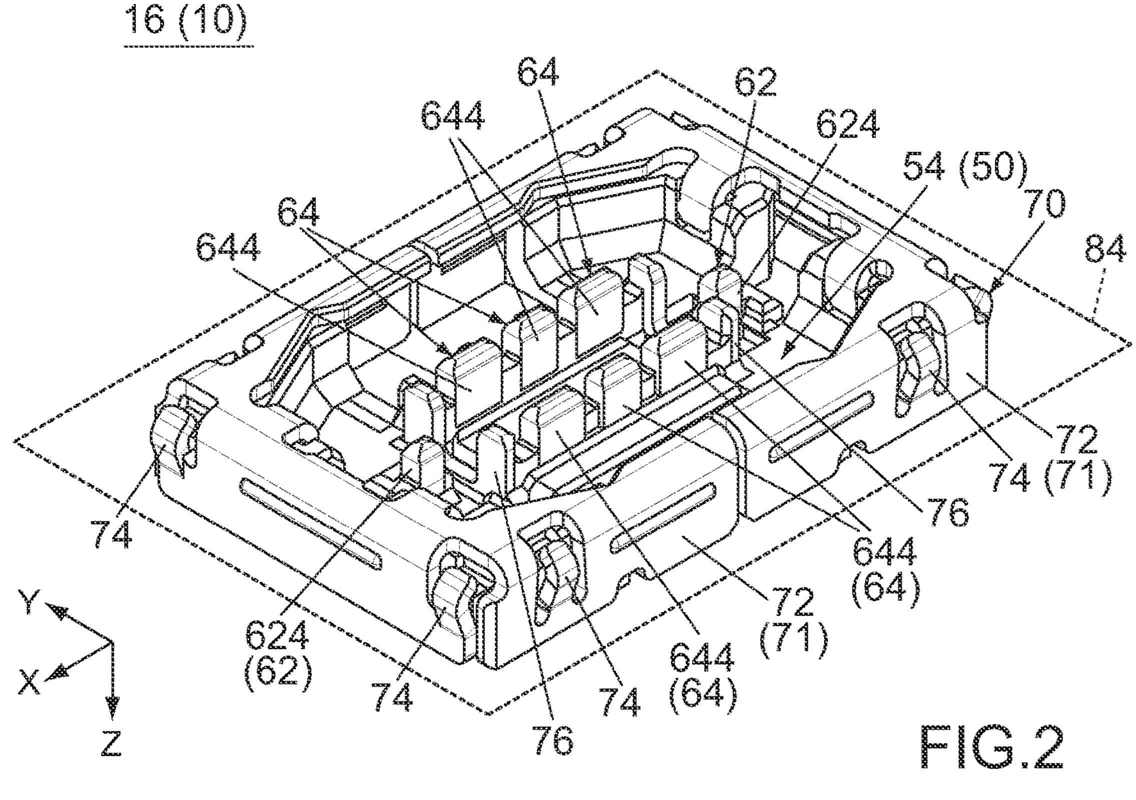
FIG. 2 is a perspective view showing a mating connector of the connector assembly according to the present embodiment, wherein an outline of a part of a mating circuit board on which the mating connector is mounted is illustrated with dashed line.

Referring to FIGS. 1 and 2, a connector assembly 10 according to an embodiment of the present invention comprises a connector 12 and a mating connector 16. The connector 12 is mounted on a circuit board 82 when used. The mating connector 16 is mounted on a mating circuit board 84 when used. Thus, each of the connector 12 and the mating connector 16 of the present embodiment is a so-called on-board connector. The connector 12 is a receptacle. The mating connector 16 is a plug. However, the present invention is not limited thereto but can be applicable to various connector assemblies including the connector assembly 10.

Figure 3:
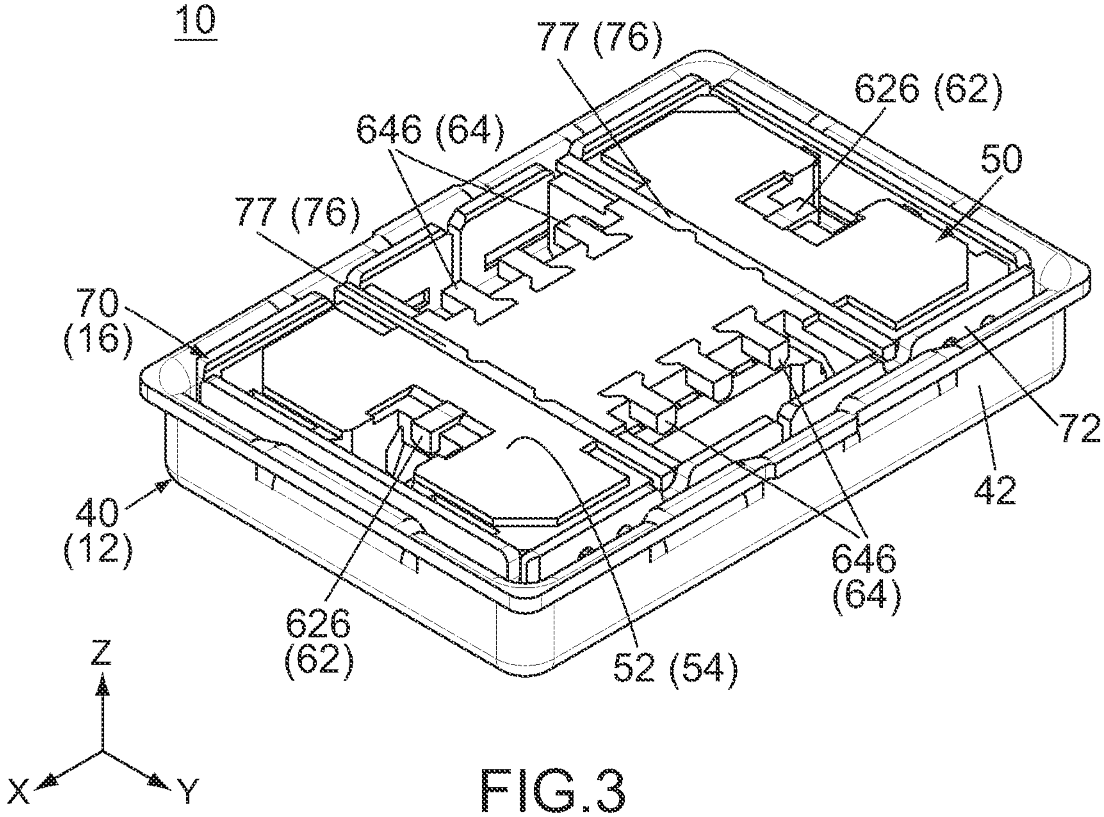
FIG. 3 is a perspective view showing the connector assembly comprising the connector of FIG. 1 and the mating connector of FIG. 2, wherein the connector assembly is under a mated state where the connector and the mating connector are mated with each other.
Figure 4:
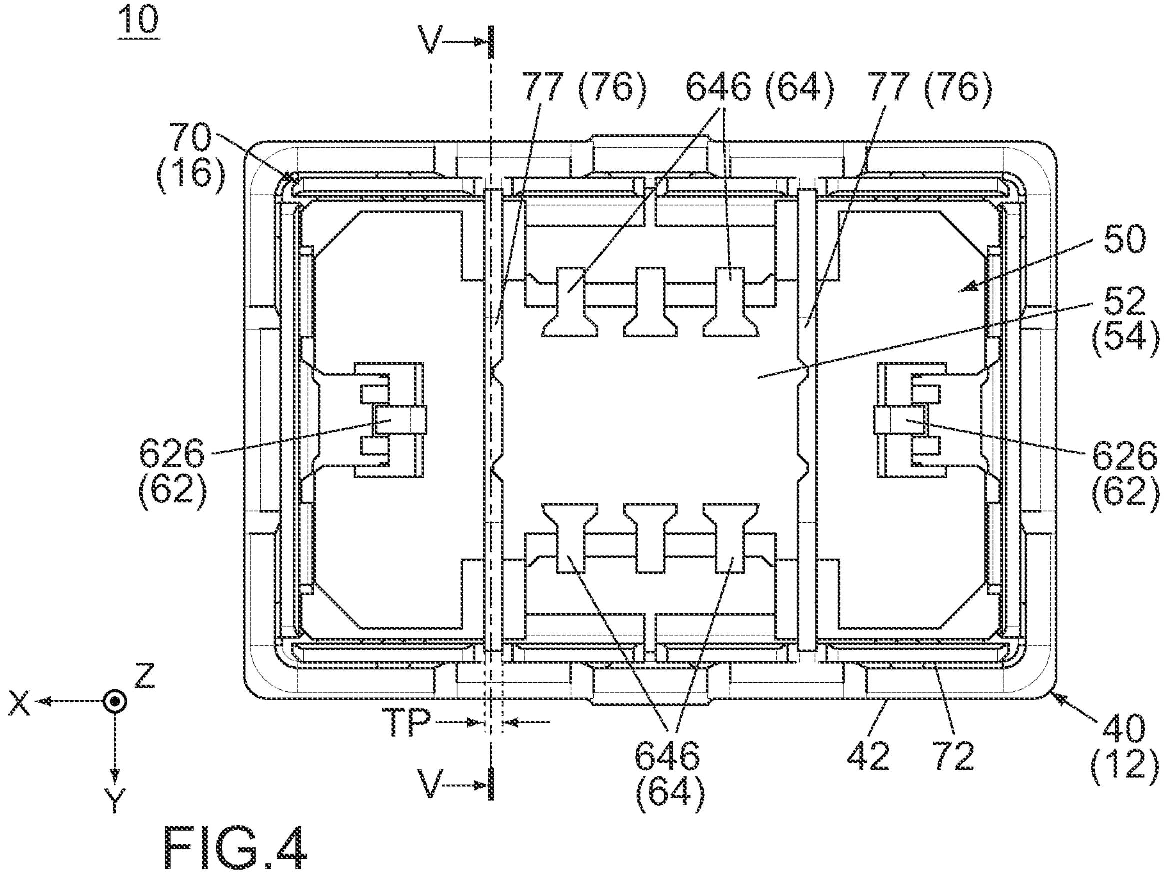
FIG. 4 is a top view showing the connector assembly of FIG. 3.
Figure 5:
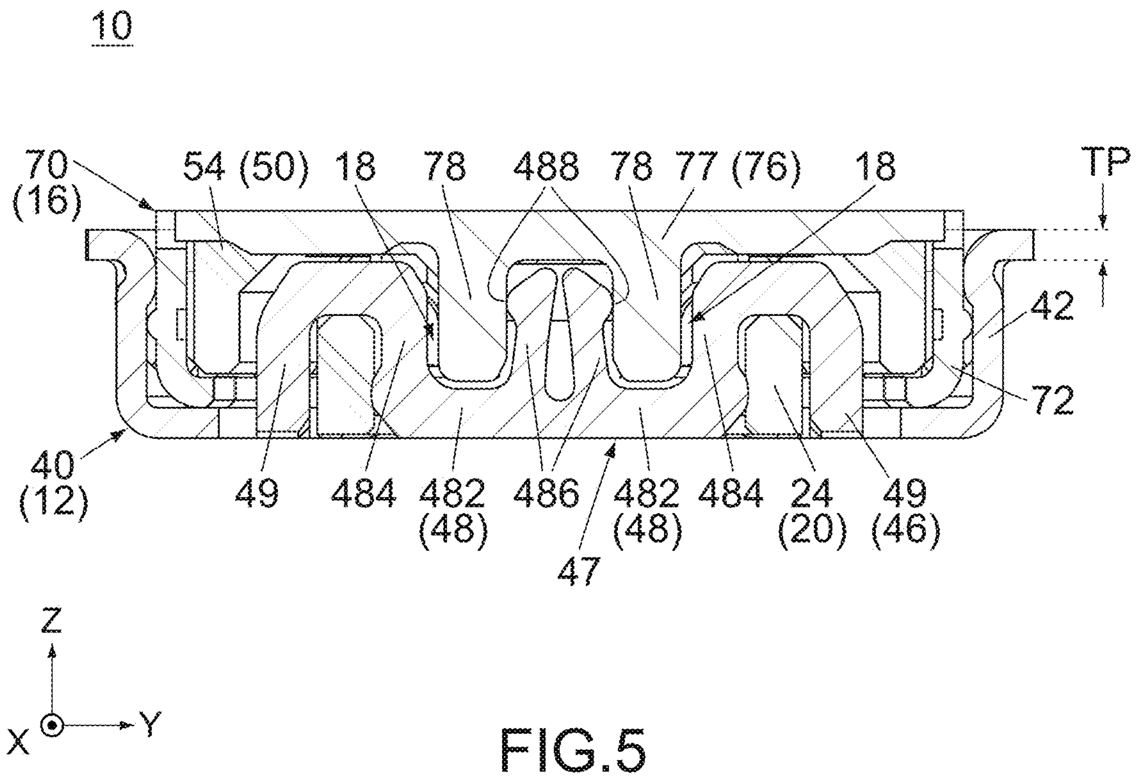
FIG. 5 is a cross-sectional view showing the connector assembly of FIG. 4, taken along line V-V.

Referring to FIGS. 3 to 5, the connector 12 and the mating connector 16 are mateable with each other along an upper-lower direction. The upper-lower direction of the present embodiment is the Z-direction. "Upward" means the positive Z-direction. "Downward" means the negative Z-direction. Before mated with each other, the connector 12 and the mating connector 16 are under a separated state (not shown) where they are separated from each other in the upper-lower direction. The mating connector 16 under the separated state is located above the connector 12. The mating connector 16 under the separated state is mateable with the connector 12 when moved downward. Under a mated state, or a state shown in FIGS. 3 to 5, where the connector 12 and the mating connector 16 are mated with each other, the circuit board 82 (see FIG. 1) is electrically connected with the mating circuit board 84 (see FIG. 2).

Hereafter, explanation will be made about the mating connector 16 of the present embodiment.

Referring to FIG. 2, the mating connector 16 of the present embodiment comprises a mating housing 50 made of insulator, a plurality of first mating terminals 62 each made of conductor, a plurality of second mating terminals 64 each made of conductor, a mating shell 70 made of conductor and two mating shield portions 76 each made of conductor. The mating connector 16 of the present embodiment has the aforementioned members. However, the present invention is not limited thereto. For example, each of the number of the first mating terminals 62 and the number of the second mating terminals 64 may be one. The mating connector 16 may further comprise another member in addition to the aforementioned members.

Figure 10:
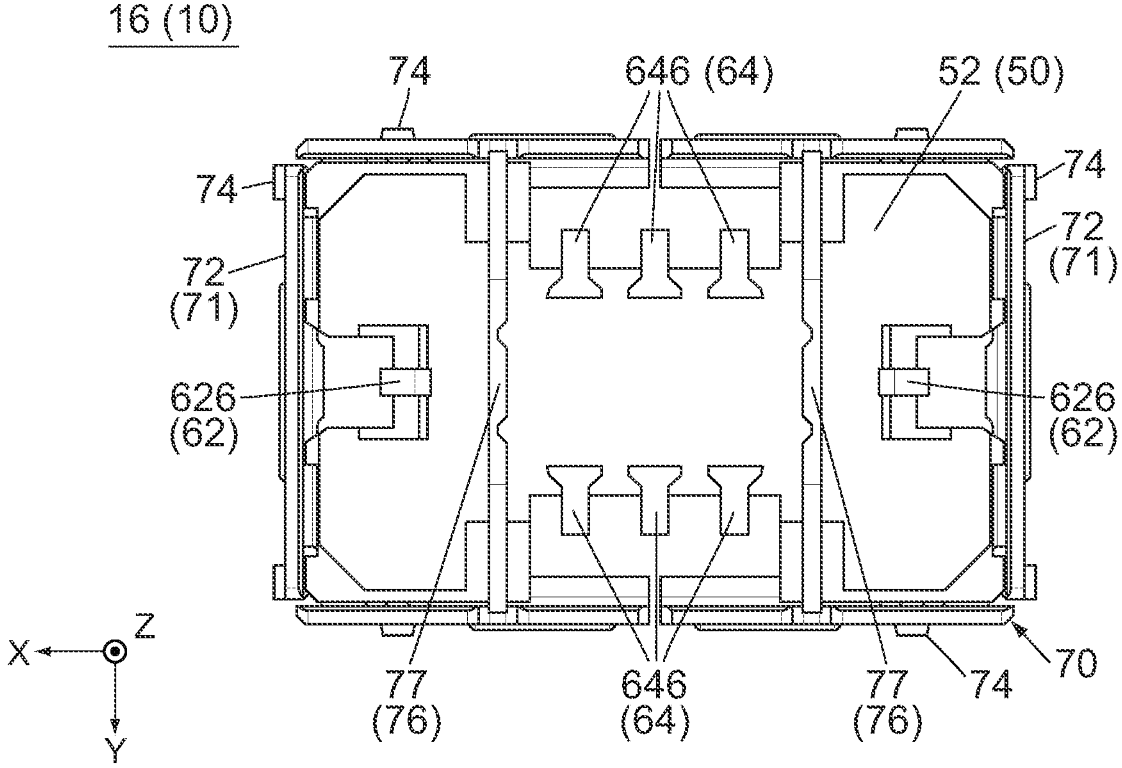
FIG. 10 is a top view showing the mating connector of FIG. 2.

As shown in FIGS. 3, 4 and 10, the mating housing 50 has a bottom surface 52. Referring to FIGS. 3 and 4, under the mated state, the bottom surface 52 is located at an upper end of the mating housing 50 and extends along a horizontal plane (XY-plane) perpendicular to the upper-lower direction. As can be seen from FIGS. 3 and 4, when the connector 12 and the mating housing 50 are under the separated state where they are separated from each other, the bottom surface 52 of the mating housing 50 is located at the upper end of the mating housing 50 and faces upward. In the following explanation, a position of each of members and portions of the mating connector 16 in the upper-lower direction is a position under a state where the bottom surface 52 is located at the upper end of the mating housing 50.

Figure 9:
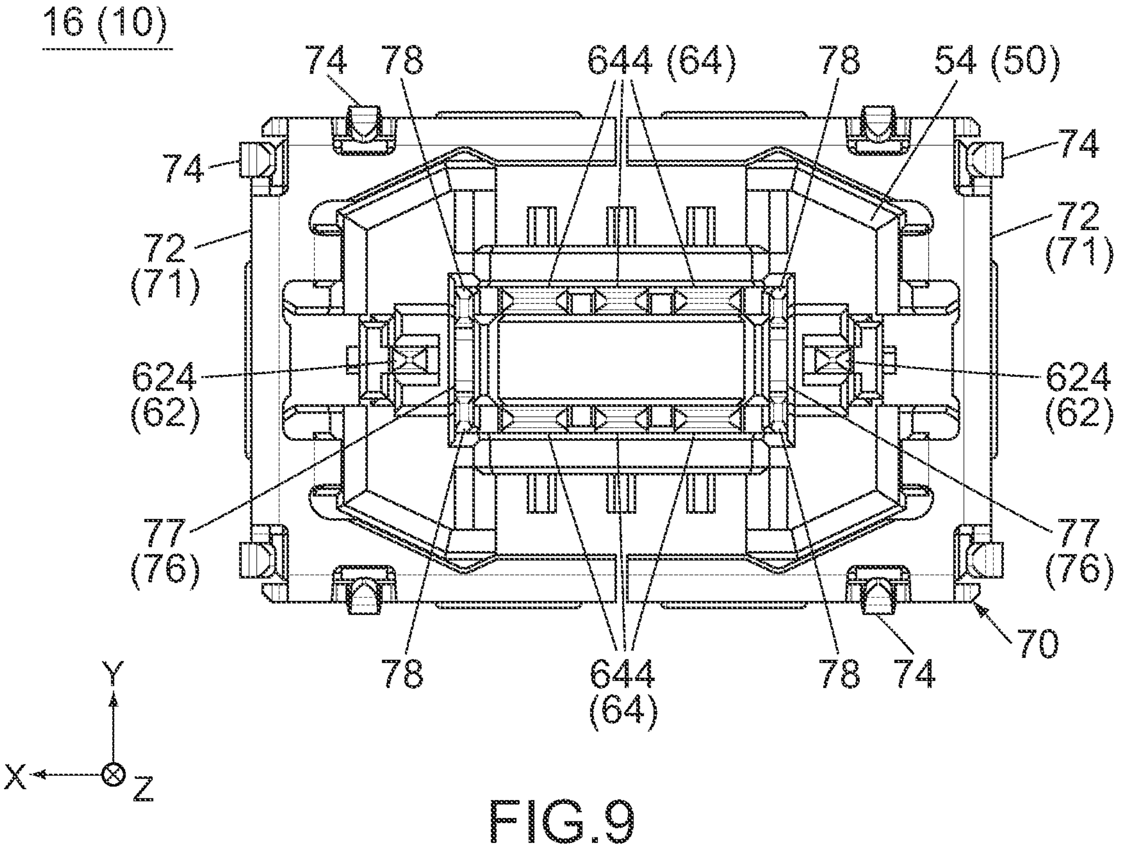
FIG. 9 is a bottom view showing the mating connector of FIG. 2.

As shown in FIGS. 2 and 9, the mating housing 50 has a mating holding portion 54. The mating holding portion 54 protrudes downward from the bottom surface 52 (see FIG. 10). The mating housing 50 of the present embodiment is a unitary member which has the aforementioned structure. However, the present invention is not limited thereto. For example, the mating housing 50 may be formed of two or more members which are combined to each other. The mating housing 50 may further have another portion in addition to the aforementioned portions.

Referring to FIG. 2, the mating connector 16 of the present embodiment comprises two of the first mating terminals 62 each made of metal. Each of the first mating terminals 62 is held by the mating holding portion 54. The two first mating terminals 62 are located at opposite sides of the mating holding portion 54 in a pitch direction, respectively. The pitch direction of the present embodiment is the X-direction. The two first mating terminals 62 are arranged to be mirror images to each other with respect to a vertical plane (YZ-plane) perpendicular to the pitch direction. The first mating terminals 62 of the present embodiment are arranged as described above. However, the arrangement of the first mating terminals 62 of the present invention is not specifically limited.

Referring to FIGS. 2, 9 and 10, the first mating terminals 62 of the present embodiment have structures same as each other. Each of the first mating terminals 62 has a first mating contact portion 624 and a first mating fixed portion 626. The first mating contact portion 624 has a cuboid shape and projects downward from the mating holding portion 54. The first mating fixed portion 626 is exposed upward from the bottom surface 52 of the mating holding portion 54. The first mating fixed portion 626 is fixed on and connected to a conductive pad (not shown) of the mating circuit board 84 via soldering, etc. when the mating connector 16 is mounted on the mating circuit board 84. Each of the first mating terminals 62 of the present embodiment has the aforementioned structure. However, the structure of the first mating terminal 62 of the present invention is not specifically limited.

Referring to FIG. 2, the mating connector 16 of the present embodiment comprises six of the second mating terminals 64 each made of metal. Each of the second mating terminals 64 is held by the mating holding portion 54. The six second mating terminals 64 are divided into two rows in a lateral direction perpendicular to both the upper-lower direction and the pitch direction. The lateral direction of the present embodiment is the Y-direction. The three second mating terminals 64 of each row are arranged in the pitch direction. The two rows of the second mating terminals 64 are arranged to be mirror images to each other with respect to a predetermined plane (XZ-plane) perpendicular to the lateral direction. The second mating terminals 64 of the present embodiment are arranged as described above. However, the arrangement of the second mating terminals 64 of the present invention is not specifically limited.

Referring to FIGS. 2, 9 and 10, the second mating terminals 64 of the present embodiment have structures same as each other except for their different sizes in the pitch direction. Each of the second mating terminals 64 has a second mating contact portion 644 and a second mating fixed portion 646. The second mating contact portion 644 has a flat-plate shape and projects downward from the mating holding portion 54. The second mating fixed portion 646 is exposed upward from the bottom surface 52 of the mating holding portion 54. The second mating fixed portion 646 is fixed on and connected to a conductive pad (not shown) of the mating circuit board 84 via soldering, etc. when the mating connector 16 is mounted on the mating circuit board 84. Each of the second mating terminals 64 of the present embodiment has the aforementioned structure. However, the structure of the second mating terminal 64 of the present invention is not specifically limited.

The mating shell 70 of the present embodiment has a mating peripheral wall 72. In detail, the mating shell 70 of the present embodiment comprises two partial shells 71. Each of the partial shells 71 is a single metal plate with bends. Each of the partial shells 71 includes a half of the mating peripheral wall 72 in the pitch direction. The two partial shells 71 are arranged in the pitch direction with a slight distance formed therebetween. However, the present invention is not limited thereto. For example, the mating shell 70 may be a single metal plate with bends.

The mating peripheral wall 72 of the present embodiment is a part of the mating shell 70. In other words, the mating peripheral wall 72 is formed integrally with the mating shell 70. In contrast, each of the mating shield portions 76 of the present embodiment is a member other than the mating shell 70 and is not in contact with the mating shell 70. However, the present invention is not limited thereto. For example, each of the mating shield portions 76 may be a part of the mating shell 70.

Referring to FIG. 2, the mating peripheral wall 72 is fixed on and grounded to a conductive pad (not shown) of the mating circuit board 84 via soldering, etc. when the mating connector 16 is mounted on the mating circuit board 84. The mating peripheral wall 72 encloses the mating holding portion 54 in the XY-plane. Thus, the mating peripheral wall 72 electro-magnetically shields the first mating terminals 62 and the second mating terminals 64 in the XY-plane.

The mating peripheral wall 72 of the present embodiment is formed with eight spring pieces 74. Each of the spring pieces 74 protrudes outward from the mating peripheral wall 72 in the XY-plane so as to be away from the mating holding portion 54. Each of the spring pieces 74 is resiliently deformable so as to be close to the mating holding portion 54 in the XY-plane. The mating peripheral wall 72 of the present embodiment has the aforementioned structure. However, the present invention is not limited thereto. For example, the spring pieces 74 may be provided as necessary.

Referring to FIG. 5, each of the mating shield portions 76 of the present embodiment has a flat-plate shape extending in parallel to the YZ-plane. Each of the mating shield portions 76 extend to a position close to an upper end of the mating peripheral wall 72 in the lateral direction but is not connected to the mating peripheral wall 72. Referring to FIG. 10, each of the mating shield portions 76 is held by the mating holding portion 54. Each of the mating shield portions 76 has an upper end which is exposed upward from the mating holding portion 54. The upper end of each of the mating shield portions 76 is fixed on and grounded to a conductive pad (not shown) of the mating circuit board 84 via soldering, etc. when the mating connector 16 is mounted on the mating circuit board 84 (see FIG. 2). Each of the thus-grounded mating shield portions 76 has a ground voltage and works as a mating ground terminal.

In the present embodiment, the mating peripheral wall 72 is partially held by the mating housing 50, and thereby the mating shell 70 is attached and fixed to the mating housing 50. However, the present invention is not limited thereto. For example, when each of the mating shield portions 76 is a part of the mating shell 70, the mating shell 70 will be attached to the mating housing 50 because the mating shield portions 76 are held by the mating housing 50.

Referring to FIGS. 2, 9 and 10, the two mating shield portions 76 are arranged so that the two rows of the second mating terminals 64 are located therebetween in the pitch direction. Each of the mating shield portions 76 is located between the first mating terminal 62 and the second mating terminal 64 in the pitch direction. Referring to FIG. 5, each of the mating shield portions 76 has a mating plate portion 77. Each of the mating plate portions 77 is a middle part of the mating shield portion 76 in the lateral direction. Each of the mating plate portions 77 has two connection portions 78 and an upper end portion which is exposed upward from the mating holding portion 54. The two connection portions 78 are arranged in the lateral direction. Each of the connection portions 78 has a flat-plate shape and projects downward from the upper end portion of the mating plate portion 77.

Hereafter, explanation will be made about the connector 12 of the present embodiment.

Referring to FIG. 1, the connector 12 of the present embodiment comprises a housing 20 made of insulator, a plurality of first terminals 32 each made of conductor, a plurality of second terminals 34 each made of conductor and a shell 40 made of conductor. Referring to FIG. 1 together with FIG. 2, the first terminals 32 are provided so as to correspond to the first mating terminals 62 of the mating connector 16, respectively. The second terminals 34 are provided so as to correspond to the second mating terminals 64 of the mating connector 16, respectively. The connector 12 of the present embodiment has the aforementioned members. However, the present invention is not limited thereto. For example, each of the number of the first terminals 32 and the number of the second terminals 34 may be one. The connector 12 may further comprise another member in addition to the aforementioned members.

Figure 6:
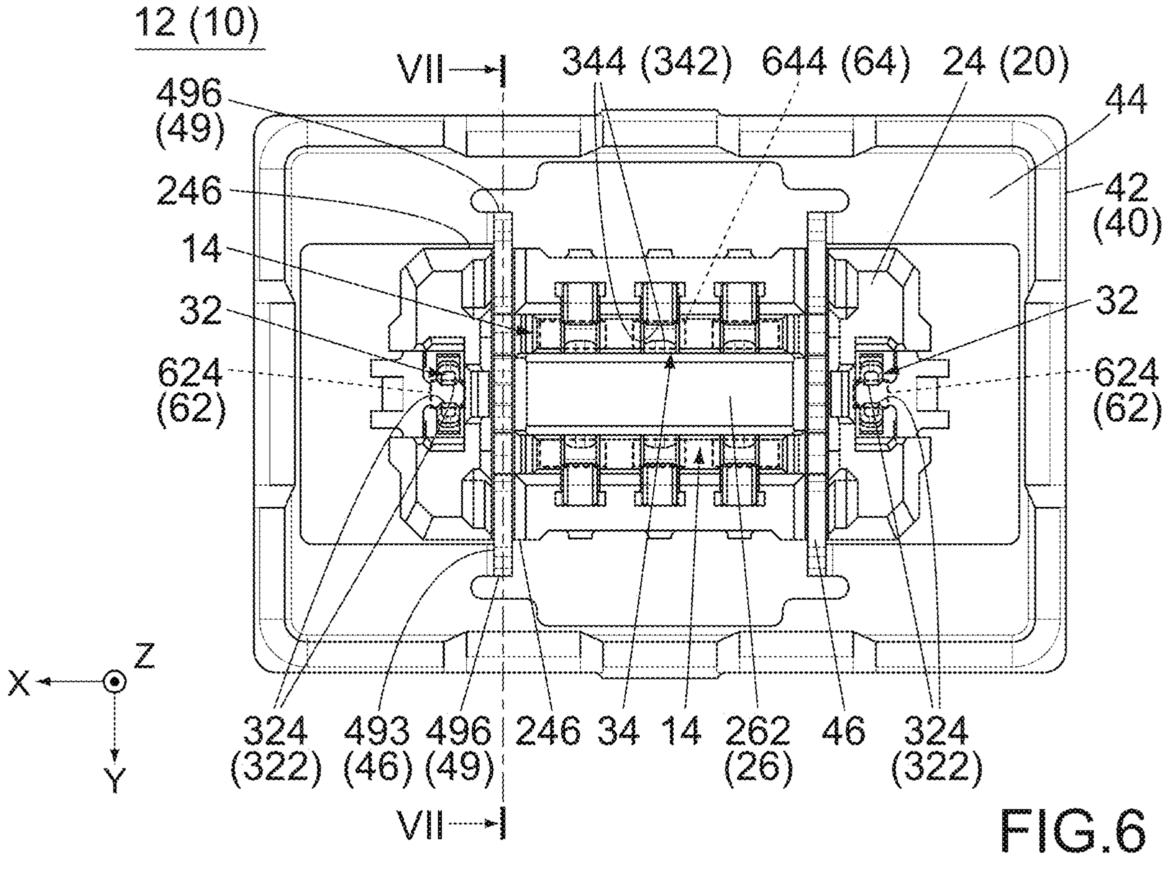
FIG. 6 is a top view showing the connector of FIG. 1, wherein positions of first mating terminals and second mating terminals of the mating connector under the mated state are illustrated with dashed line.
Figure 8:
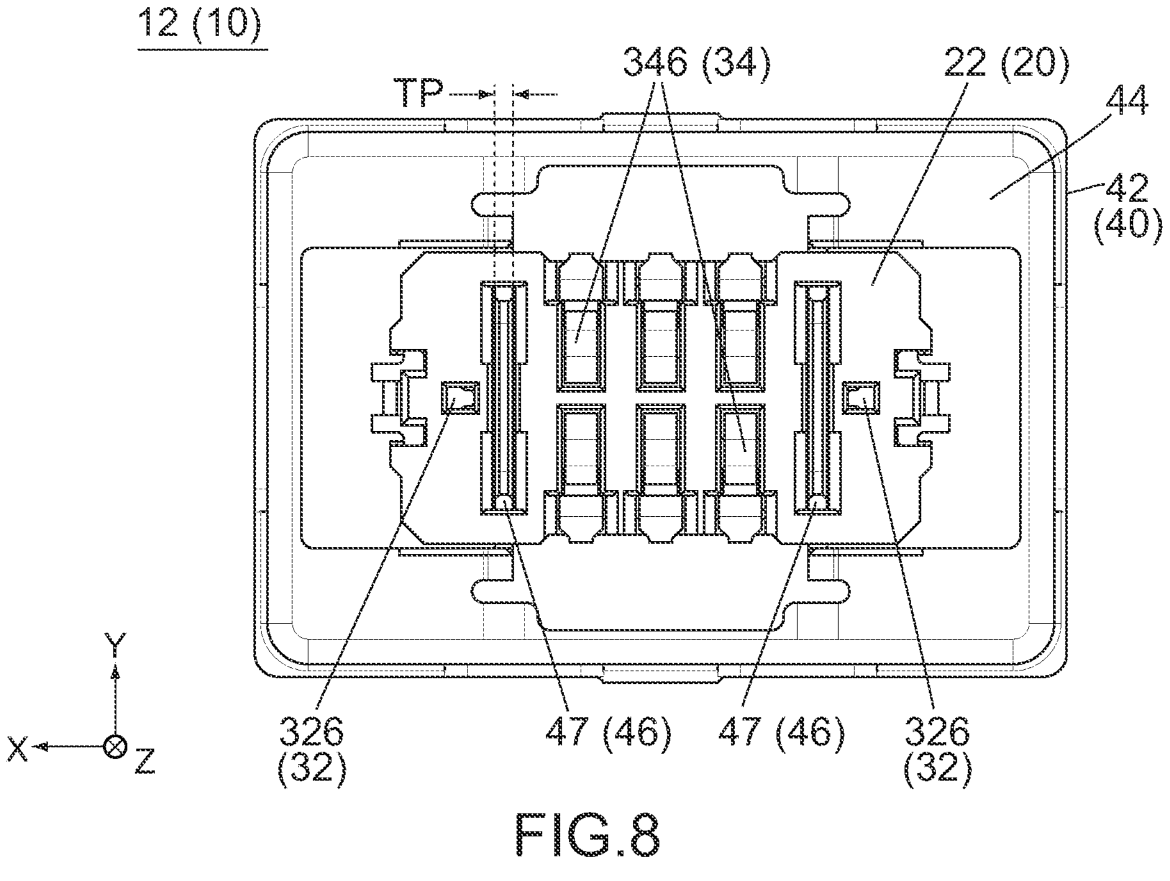
FIG. 8 is a bottom view showing the connector of FIG. 1.

As shown in FIG. 8, the housing 20 has a bottom surface 22. The bottom surface 22 is located at a lower end of the housing 20 and extends along the XY-plane. As shown in FIGS. 1 and 6, the housing 20 has a holding portion 24 and a central projecting portion 26. The holding portion 24 and the central projecting portion 26 protrude upward from the bottom surface 22 (see FIG. 8). The central projecting portion 26 is enclosed by the holding portion 24 in the XY-plane. The housing 20 of the present embodiment is a unitary member which has the aforementioned structure. However, the present invention is not limited thereto. For example, the housing 20 may be formed of two or more members which are combined to each other. The housing 20 may further have another portion in addition to the aforementioned portions.

As shown in FIG. 1, the holding portion 24 of the present embodiment has two middle holding portions 242 and four corner portions 244. The two middle holding portions 242 are located at opposite sides of the holding portion 24 in the lateral direction, respectively, and extend in parallel to each other along the pitch direction. The four corner portions 244 are located at four corners of the holding portion 24 in the XY-plane, respectively. The central projecting portion 26 of the present embodiment is located between the two middle holding portions 242 in the lateral direction and extends along the pitch direction. The central projecting portion 26 has an upper wall 262. The upper wall 262 is located at an upper end of the central projecting portion 26. A receiving portion 14 is formed between the central projecting portion 26 and each of the middle holding portions 242 in the lateral direction. Each of the receiving portions 14 is a space recessed downward and extends along the pitch direction.

Each of the holding portion 24 and the central projecting portion 26 of the present embodiment has the aforementioned structure. However, the present invention is not limited thereto. For example, the central projecting portion 26 may be provided as necessary. The structure of each of the holding portion 24 and the central projecting portion 26 is not specifically limited.

Referring to FIG. 1, the connector 12 of the present embodiment comprises two of the first terminals 32 each made of metal. The two first terminals 32 are located at opposite sides of the holding portion 24 in the pitch direction, respectively. The two first terminals 32 are arranged to be mirror images to each other with respect to the YZ-plane. Each of the first terminals 32 is located between two of the corner portions 244 which are arranged in the lateral direction and is held by the holding portion 24. In other words, the holding portion 24 holds the first terminals 32. The first terminals 32 of the present embodiment are arranged as described above. However, the arrangement of the first terminals 32 of the present invention is not specifically limited.

Figure 12:
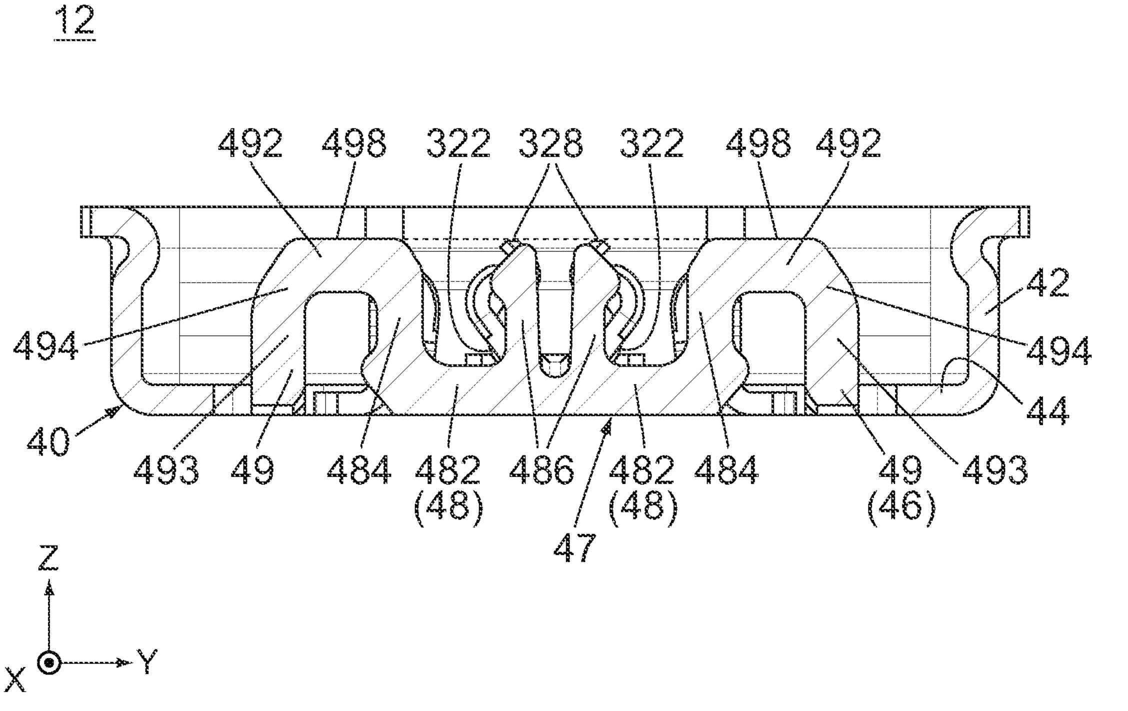
FIG. 12 is a cross-sectional view showing the connector of FIG. 11, taken along line XII-XII, wherein a position of an upper end of an armor is illustrated with dashed line.

Referring to FIGS. 6, 8 and 12, the first terminals 32 of the present embodiment have structures same as each other. Each of the first terminals 32 has two first spring portions 322, two first contact portions 324 and a first fixed portion 326. Referring to FIG. 8, the first fixed portion 326 is exposed downward from the bottom surface 22 of the holding portion 24. The first fixed portion 326 is fixed on and connected to a conductive pad (not shown) of the circuit board 82 via soldering, etc. when the connector 12 is mounted on the circuit board 82 (see FIG. 1).

Referring to FIG. 12 together with FIG. 6, each of the first spring portions 322 extends upward from the holding portion 24 and is resiliently deformable. Referring to FIG. 6, in each of the first terminals 32, the two first spring portions 322 are arranged in the lateral direction. In each of the first terminals 32, the two first contact portions 324 are provided on the first spring portions 322, respectively, and face each other in the lateral direction. Each of the first contact portions 324 is movable in the lateral direction in accordance with resilient deformation of the first spring portion 322. Each of the first terminals 32 of the present embodiment has the aforementioned structure. However, the structure of the first terminal 32 of the present invention is not specifically limited.

Under the mated state, the first mating contact portion 624 of each of the first mating terminals 62 is sandwiched and held between the two first contact portions 324 of the corresponding first terminal 32 while the first spring portions 322 are resiliently deformed. In other words, under the mated state, each of the first terminals 32 and the corresponding first mating terminal 62 are electrically connected with each other. Each of the first terminals 32 and the first mating terminals 62 of the present embodiment is a terminal for transmitting high frequency signals. In other words, the first terminal 32 and the first mating terminal 62, which are connected to each other, transmit high frequency signals. However, the present invention is not limited thereto. For example, each of the first terminals 32 and the first mating terminals 62 may be a terminal for transmitting low frequency signals.

Referring to FIG. 1, the connector 12 of the present embodiment comprises six of the second terminals 34 each made of metal. The six second terminals 34 are divided into two rows in the lateral direction. The three second terminals 34 of each row are arranged in the pitch direction. The two rows of the second terminals 34 are arranged to be mirror images to each other with respect to the XZ-plane. The two rows of the second terminals 34 correspond to the two middle holding portions 242, respectively. Each of the second terminals 34 is held by the corresponding middle holding portion 242. In other words, the holding portion 24 holds the second terminals 34. The second terminals 34 of the present embodiment are arranged as described above. However, the arrangement of the second terminals 34 of the present invention is not specifically limited.

Figure 13:
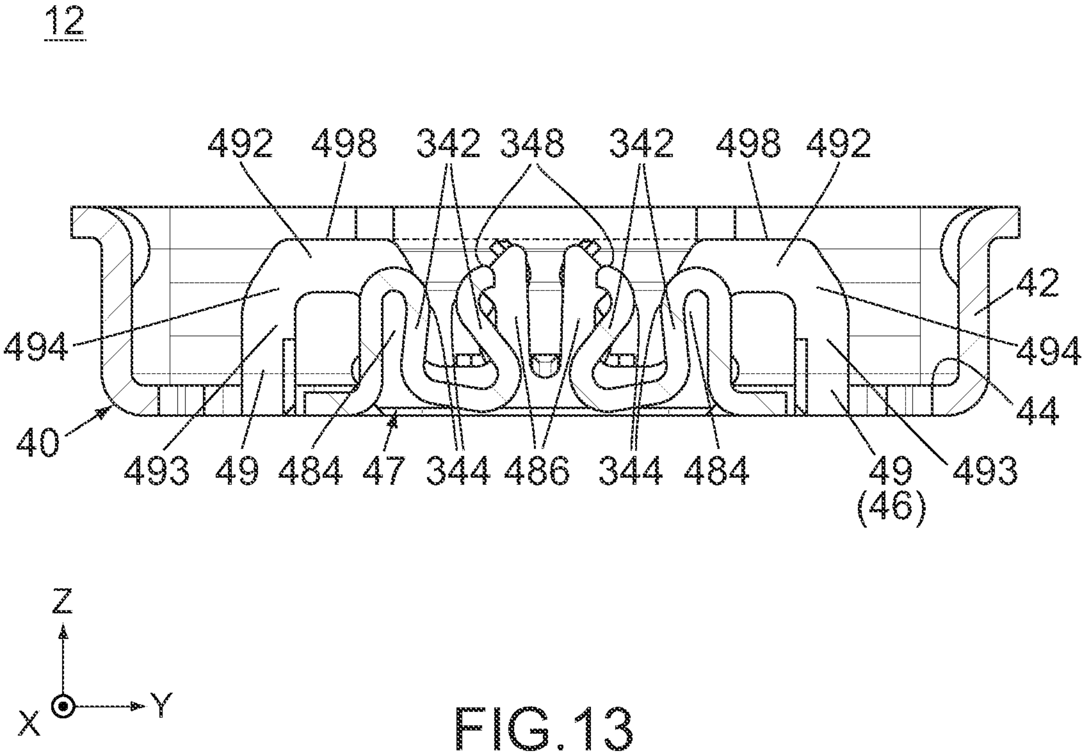
FIG. 13 is a cross-sectional view showing the connector of FIG. 11, taken along line XIII-XIII, wherein a position of the upper end of the armor is illustrated with dashed line.
Figure 14:
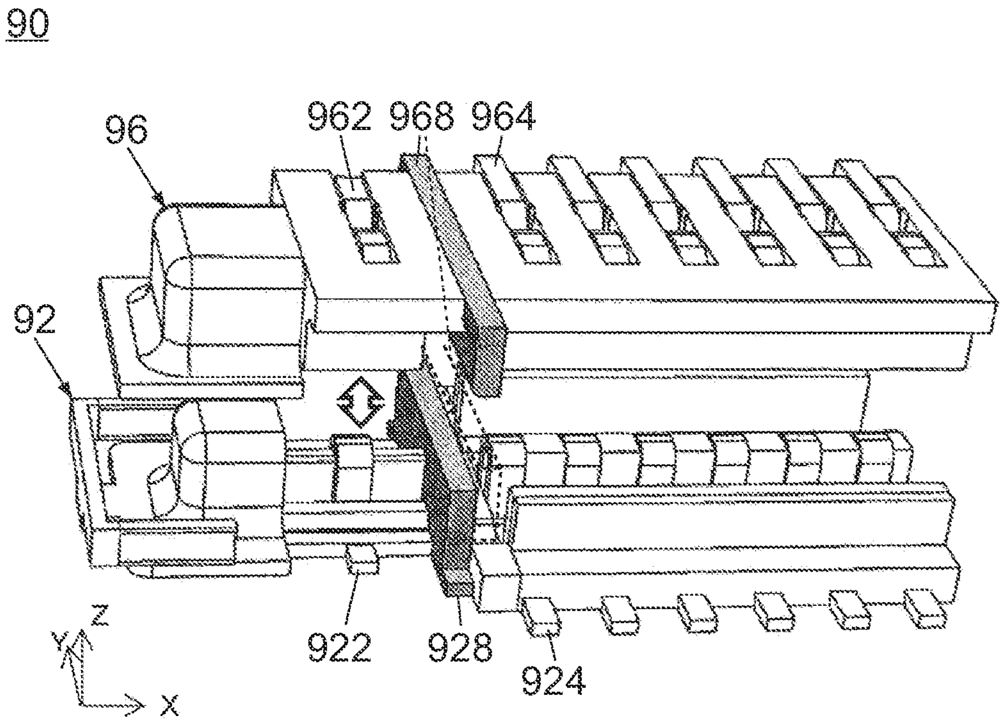
FIG.14 PRIOR ART
FIG. 14 is a perspective view showing a connector assembly of Patent Document 1, wherein a connector and a mating connector of the connector assembly are separated from each other, and a rough position of a second partial wall terminal under a state where the connector and the mating connector are mated with each other is illustrated with dashed line.

Referring to FIGS. 6, 8 and 13, the second terminals 34 of the present embodiment have structures same as each other. Each of the second terminals 34 has two second spring portions 342, two second contact portions 344 and a second fixed portion 346. Referring to FIG. 8, the second fixed portion 346 is exposed downward from the bottom surface 22 of the holding portion 24. The second fixed portion 346 is fixed on and connected to a conductive pad (not shown) of the circuit board 82 via soldering, etc. when the connector 12 is mounted on the circuit board 82 (see FIG. 1).

Referring to FIG. 13 together with FIG. 6, each of the second spring portions 342 extends upward from the holding portion 24 and is resiliently deformable. In each of the second terminals 34, the two second spring portions 342 are arranged in the lateral direction. In each of the second terminals 34, the two second contact portions 344 are provided on the second spring portions 342, respectively, and face each other in the lateral direction. Referring to FIG. 6, each of the second contact portions 344 is located in the receiving portion 14 and is movable in the lateral direction in accordance with resilient deformation of the second spring portion 342. Each of the second terminals 34 of the present embodiment has the aforementioned structure. However, the structure of the second terminal 34 of the present invention is not specifically limited.

Under the mated state, the second mating contact portions 644 of the second mating terminals 64 are received in the receiving portions 14. Each of the second mating contact portions 644 is sandwiched and held between the two second contact portions 344 of the corresponding second terminal 34 while the second spring portions 342 are resiliently deformed. In other words, under the mated state, each of the second terminals 34 and the corresponding second mating terminal 64 are electrically connected with each other. Each of the second terminals 34 and the second mating terminals 64 of the present embodiment is a terminal for transmitting low frequency signals. In other words, the second terminal 34 and the second mating terminal 64, which are connected to each other, transmit low frequency signals. However, the present invention is not limited thereto. For example, each of the second terminals 34 and the second mating terminals 64 may be a terminal for transmitting high frequency signals.

Referring to FIG. 1, the shell 40 of the present embodiment has a peripheral wall 42, a lower plate 44 and two shield portions 46. Thus, the connector 12 comprises the peripheral wall 42, the lower plate 44 and the shield portions 46. The shell 40 of the present embodiment is a single metal plate with bends. However, the present invention is not limited thereto. For example, the shell 40 may be formed by combining two metal plates each of which is formed with bends.

Each of the peripheral wall 42, the lower plate 44 and the shield portions 46 of the present embodiment is a part of the shell 40. In other words, each of the peripheral wall 42, the lower plate 44 and the shield portions 46 is formed integrally with the shell 40. The shell 40 with this structure has high strength. However, the present invention is not limited thereto. For example, the peripheral wall 42, the lower plate 44 and the shield portions 46 may be members formed separately from each other.

The peripheral wall 42 is fixed on and grounded to a conductive pad (not shown) of the circuit board 82 via soldering, etc. when the connector 12 is mounted on the circuit board 82. The peripheral wall 42 is apart from the holding portion 24 and encloses the holding portion 24 in the XY-plane. The peripheral wall 42 has an upper end which protrudes outward in the XY-plane so as to be away from the holding portion 24 in the XY-plane. Referring to FIGS. 3 and 4 together with FIG. 1, the peripheral wall 42 and the mating peripheral wall 72 under the mated state enclose and electromagnetically shield the first terminals 32, the second terminals 34, the first mating terminals 62 and the second mating terminals 64 in the XY-plane.

As previously described, the mating peripheral wall 72 of the present embodiment includes two portions which are slightly apart from each other in the pitch direction. In contrast, the peripheral wall 42 of the present embodiment is a unitary portion and can enclose the mating peripheral wall 72 substantially with no gap in the XY-plane. However, the present invention is not limited thereto. For example, the mating peripheral wall 72 may be a unitary portion. In this instance, the peripheral wall 42 may include two portions.

Figure 7:
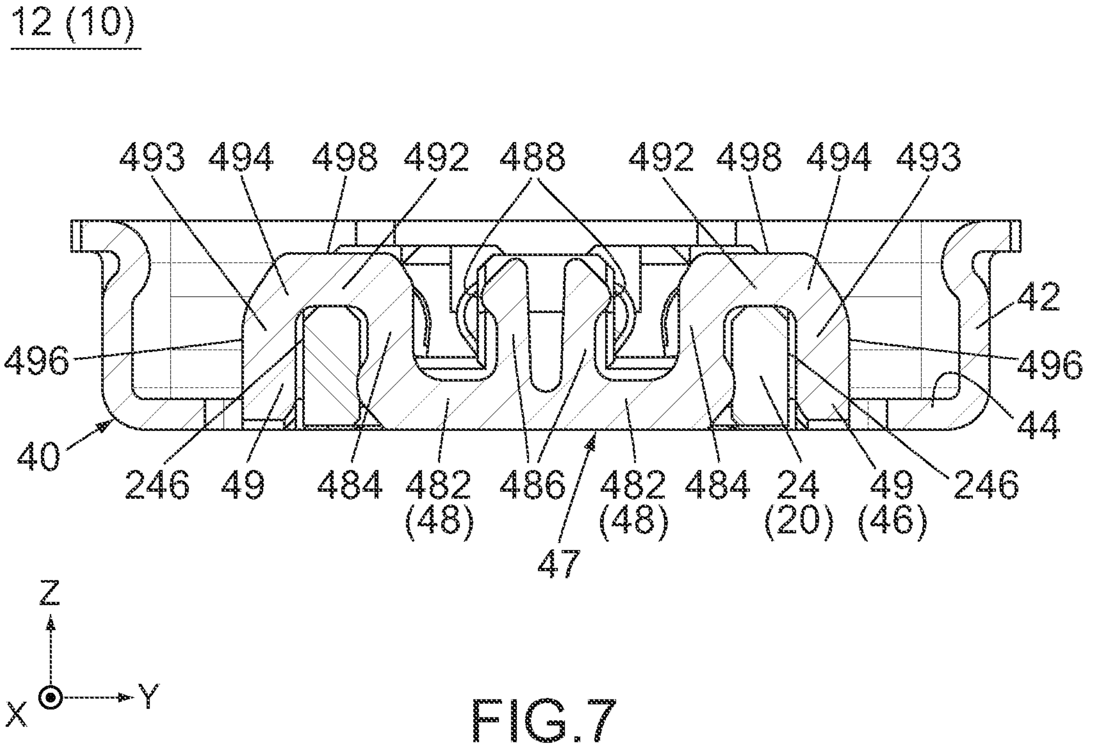
FIG. 7 is a cross-sectional view showing the connector of FIG. 6, taken along line VII-VII.
Figure 11:
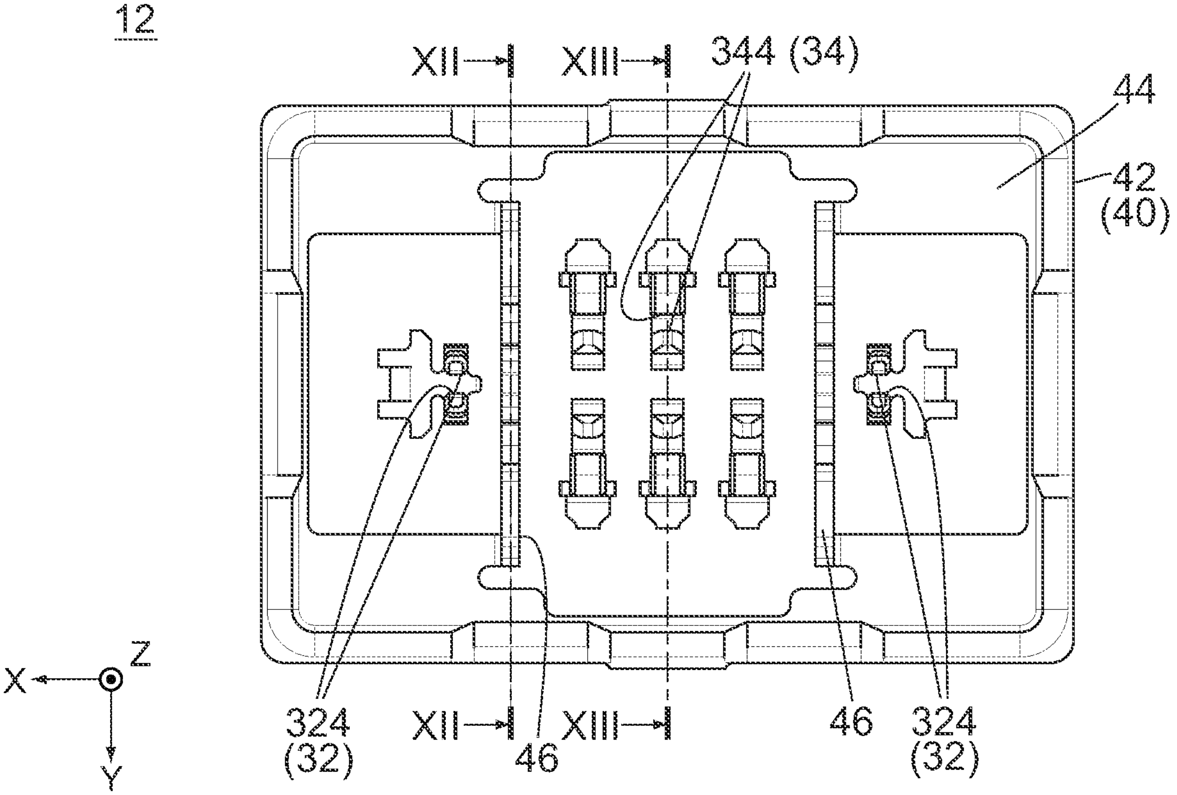
FIG. 11 is a top view showing the connector of FIG. 1, wherein a housing of the connector is not illustrated.

Referring to FIGS. 6 and 7, the lower plate 44 extends between the peripheral wall 42 and the holding portion 24 along the XY-plane. Referring to FIGS. 11 to 13, each of the shield portions 46 of the present embodiment is formed of a part of the lower plate 44 which is bent at a right angle. Thus, each of the shield portions 46 has a ground voltage same as that of the shell 40 and works as a ground terminal. Each of the shield portions 46 has a flat-plate shape extending in parallel to the YZ-plane. Each of the shield portions 46 extends in the lateral direction and is connected to the lower plate 44.

Referring to FIGS. 6 and 7, each of the shield portions 46 is held by the holding portion 24. In other words, the holding portion 24 holds the shield portions 46. Referring to FIG. 8, each of the shield portions 46 has a lower end which is exposed downward from the holding portion 24. The lower end of each of the shield portions 46 is fixed on and grounded to a conductive pad (not shown) of the circuit board 82 via soldering, etc. when the connector 12 is mounted on the circuit board 82 (see FIG. 1). Each of the thus-grounded shield portions 46 more stably works as the ground terminal.

Referring to FIG. 8, the shield portions 46 are held by the holding portion 24, and thereby the shell 40 of the present embodiment is attached and fixed to the housing 20. However, the present invention is not limited thereto. For example, the shell 40 may be attached to the housing 20 by some portion other than the shield portions 46.

Referring to FIGS. 1, 6 and 8, the two shield portions 46 are arranged so that the two rows of the second terminals 34 are located therebetween in the pitch direction. Each of the shield portions 46 is located between the first terminal 32 and the second terminal 34 in the pitch direction. Referring to FIG. 7, each of the shield portions 46 has a plate portion 47 and two armors 49. Each of the plate portions 47 is a middle part of the shield portion 46 in the lateral direction. The two armors 49 of each of the shield portions 46 are located at opposite sides of the plate portion 47 in the lateral direction, respectively.

Hereafter, further specific explanation will be made about one of the armors 49 of the present embodiment. The explanation described below is applicable to each of the armors 49.

As shown in FIGS. 1 and 7, the armor 49 projects outward from the holding portion 24 in the lateral direction. In detail, referring to FIGS. 6 and 7, the armor 49 has an outer end 496. The outer end 496 is located at the outermost position of the armor 49 in the lateral direction. The holding portion 24 has an outer end 246. The outer end 246 is located at the outermost position of the holding portion 24 in the lateral direction. The outer end 496 of the armor 49 is located outward of the outer end 246 of the holding portion 24 in the lateral direction.

Referring to FIGS. 12 and 13, the armor 49 extends upward to a position which is same as or above a position of an upper end 328 of the first terminal 32 and which is same as or above a position of an upper end 348 of the second terminals 34. In detail, the armor 49 has an upper end 498. The upper end 498 is located at the uppermost position of the armor 49. Moreover, the upper end 498 is located at the uppermost position of the shield portion 46. The first terminal 32 has the upper end 328. The upper end 328 is located at the uppermost position of the first terminal 32. The second terminal 34 has the upper end 348. The upper end 348 is located at the uppermost position of the second terminal 34. In comparison with any of the upper end 328 of the first terminal 32 and the upper end 348 of the second terminal 34, the upper end 498 of the armor 49 is located at a position which is same thereas or located thereabove.

Referring to FIGS. 1 and 2, during a mating operation in which the mating connector 16 of the present embodiment is mated with the connector 12, the connector 12 and the mating connector 16 are sandwiched between the circuit board 82 and the mating circuit board 84 and are invisible. Therefore, a blind operation is required for an operator of the mating operation in order to mate the mating connector 16 with the connector 12. For example, the operator should position the mating connector 16 to the connector 12 while changing a position of the mating connector 16 in the XY-plane.

Referring to FIG. 5 together with FIG. 1, the mating connector 16 might be improperly positioned to the connector 12 and might be inserted into the connector 12 while taking an inclined. In this situation, if the armor 49 is not provided, metal members such as the mating peripheral wall 72 of the mating shell 70 might be pressed against the housing 20, the first terminals 32 or the second terminals 34, and thereby these members might be damaged.

However, the armor 49 of the present embodiment projects outward from the holding portion 24 of the housing 20 in the lateral direction and extends in the upper-lower direction to have a height equal to or more than those of the first terminals 32 and the second terminals 34. The thus-formed armor 49 will be brought into abutment with metal members such as the mating peripheral wall 72 when the mating connector 16 is displaced in the XY-plane during the mating operation. Thus, the armor 49 of the present embodiment can protect the housing 20, the first terminals 32 and the second terminals 34 so that they are not damaged during the mating operation.

As shown in FIGS. 1 and 7, the armor 49 of the present embodiment has an upper end portion 492, a side end portion 493 and a coupling portion 494. The upper end portion 492 extends along the lateral direction. Every part of the upper end portion 492 in the lateral direction projects upward from the holding portion 24. The upper end 498 is provided on the upper end portion 492. The side end portion 493 extends along the upper-lower direction. Every part of the side end portion 493 in the upper-lower direction projects outward in the lateral direction from the holding portion 24. The outer end 496 is provided on the side end portion 493. The coupling portion 494 extends along a predetermined direction oblique to the upper-lower direction and couples the upper end portion 492 and the side end portion 493 to each other. The coupling portion 494 projects from the holding portion 24 in the YZ-plane. In detail, every part of the coupling portion 494 in the predetermined direction projects outward from the holding portion 24 in the YZ-plane.

The armor 49 of the present embodiment has the aforementioned structure. Moreover, the upper end portion 492 of the armor 49 has an inner end in the lateral direction. Ever part of the armor 49 which is located between the inner end of the upper end portion 492 and a lower end of the side end portion 493 projects from the holding portion 24. This structure more reliably prevents the damage of the housing 20, the first terminals 32 and the second terminals 34. However, the present invention is not limited thereto. For example, each of the upper end portion 492, the side end portion 493 and the coupling portion 494 may be formed in a required shape as necessary.

Referring to FIG. 1, each of the shield portions 46 of the present embodiment has the two armors 49 which project from the opposite sides of the holding portion 24 in the lateral direction, respectively. Each of the armors 49 projects upward from the holding portion 24. This structure easily prevents the damage of the housing 20, the first terminals 32 and the second terminals 34. However, the present invention is not limited thereto. For example, the number and the arrangement of the armors 49 of each of the shield portions 46 can be modified as necessary.

Referring to FIG. 5, each of the mating shield portions 76 of the present embodiment has a lower end which is located above a lower end of the mating peripheral wall 72 of the mating shell 70. Because the mating shield portions 76 are formed as described above, the housing 20, the first terminals 32 and the second terminals 34 can be prevented from being damaged by the mating shield portions 76. Referring to FIGS. 12 and 13, the upper end 498 of each of the armors 49 of the present embodiment is located below the upper end of the peripheral wall 42 of the shell 40. Referring to FIG. 1 together with FIG. 2, because the armors 49 are formed as described above, the mating housing 50, the first mating terminals 62 and the second mating terminals 64 can be prevented from being damaged by the armors 49.

Referring to FIGS. 2 and 3, in the mating operation, when the mating connector 16 is pushed downward after rough positioning of the mating connector 16 to the connector 12 in the XY-plane, each of the spring pieces 74 is guided by an upper end portion of the peripheral wall 42 and is resiliently deformed. The thus-deformed spring pieces 74 accurately position the mating connector 16 to the connector 12 in the XY-plane. Thus, the upper end portion of the peripheral wall 42 works as a guide portion in the mating operation. Each of the spring pieces 74 works as a positioning portion in the mating operation. However, the present invention is not limited thereto. For example, the guide potion and the positioning portions may be provided as necessary.

Referring to FIG. 1, the upper wall 262 of the central projecting portion 26 covers the second terminals 34 from above. The thus-formed upper wall 262 prevents damage of the second terminals 34 in the mating operation. However, the present invention is not limited thereto. For example, the central projecting portion 26 may be provided as necessary.

Hereafter, further specific explanation will be made about one of the plate portions 47 (see FIG. 7) of the present embodiment. The explanation described below is applicable to each of the plate portions 47.

As shown in FIG. 7, the plate portion 47 of the present embodiment has two projections 488. Each of the projections 488 projects in the lateral direction. Referring to FIG. 5, under the mated state, each of the projections 488 is in contact with the mating plate portion 77 of the mating connector 16 in the lateral direction. Referring to FIG. 5 together with FIGS. 1 and 2, the plate portion 47 and the mating plate portion 77 which are combined to each other as described above have a ground voltage and separate the second terminals 34 and the second mating terminals 64 from the first terminals 32 and the first mating terminals 62 in the pitch direction. Thus, the plate portion 47 and the mating plate portion 77 electro-magnetically shield the first terminals 32 and the first mating terminals 62 which transmit high frequency signals.

The shield portion 46 and the mating shield portion 76 of the present embodiment are apart from each other under the separated state. The shield portion 46 and the mating shield portion 76 are brought into contact with each other under the mated state to form a wall which is made of conductor and has a ground voltage. This conductive wall reduce noise which might be transmitted from the first terminals 32 and the first mating terminals 62 transmitting high frequency signals toward the second terminals 34 and the second mating terminals 64 transmitting low frequency signals. According to the present embodiment, the shield portion 46 and the mating shield portion 76 which are separable and distinct from each other are combined to each other to have electromagnetic shielding function.

Referring to FIG. 5, the plate portion 47 of the present embodiment is a part of the shield portion 46. The mating plate portion 77 of the present embodiment is a part of the mating shield portion 76. The projections 488 are provided only on the plate portion 47. However, the present invention is not limited thereto. For example, the plate portion 47 may be a part of the mating shield portion 76. The mating plate portion 77 may be a part of the shield portion 46. In other words, one of the shield portion 46 and the mating shield portion 76 should have the plate portion 47, and a remaining one of the shield portion 46 and the mating shield portion 76 should have the mating plate portion 77. Moreover, the mating plate portion 77 may have a projection. Thus, at least the plate portion 47 should have the projection 488.

As can be seen from FIG. 5, according to the present embodiment, under the mated state, a position of the plate portion 47, which is provided to one of the shield portion 46 and the mating shield portion 76, is equal to or overlaps with another position of the mating plate portion 77, which is provided to a remaining one of the shield portion 46 and the mating shield portion 76, in the pitch direction. This structure enables the connector assembly 10 to have the electromagnetic shielding function while the connector assembly 10 has a reduced size in the pitch direction. Thus, the present embodiment provides the connector assembly 10 having a structure which enables the connector assembly 10 to have a small size in the pitch direction.

Referring to FIGS. 5 and 8, the plate portion 47 of the present embodiment has a thickness TP which is a size in the pitch direction. Referring to FIG. 4, the mating plate portion 77 of the present embodiment has the thickness TP which is a size in the pitch direction. Referring to FIGS. 4 and 6, the thickness TP of the plate portion 47 is equal to the thickness TP of the mating plate portion 77. In addition, according to the present embodiment, the position of the plate portion 47 in the pitch direction is equal to the position of the mating plate portion 77 in the pitch direction under the mated state. In other words, the plate portion 47 and the mating plate portion 77 form one plate having constant thickness under the mated state. This structure easily reduces the size of the connector assembly 10 in the pitch direction. However, the present invention is not limited thereto. For example, the plate portion 47 may have a thickness different from another thickness of the mating plate portion 77. Under the mated stat, the position of the plate portion 47 in the pitch direction may be partially equal to the position of the mating plate portion 77 in the pitch direction.

Referring to FIG. 8, the middle part of the lower end of each of the shield portions 46 in the lateral direction is sandwiched by two parts of the holding portion 24 with a slight gap left therebetween. This slight gap has a size in the pitch direction which is very small in comparison with the thickness TP. Thus, the middle part of the lower end of each of the shield portions 46 in the lateral direction is sandwiched by the two parts of the holding portion 24 substantially with no gap. According to the present embodiment, the size of the connector 12 in the pitch direction can be made smaller. However, the present invention is not limited thereto. For example, the arrangement of the shield portions 46 can be modified as necessary.

Referring to FIG. 10, the middle part of the upper end of each of the mating shield portions 76 in the lateral direction is sandwiched by two parts of the mating holding portion 54 substantially with no gap. According to the present embodiment, the size of the mating connector 16 in the pitch direction can be made smaller. However, the present invention is not limited thereto. For example, the arrangement of the mating shield portions 76 can be modified as necessary.

Referring to FIG. 7, each of the plate portions 47 of the present embodiment has two support portions 486. Each of the support portions 486 is resiliently deformable and support the projection 488. Referring to FIG. 5 together with FIG. 7, each of the projections 488 is brought into contact with the mating plate portion 77 in accordance with resilient deformation of the support portion 486 under the mated state. The present embodiment can prevent damage such as shaving of the plate portion 47 by the mating plate portion 77 during the mating operation. In addition, the plate portion 47 of the present embodiment is brought into contact with the mating plate portion 77 at two points with a sufficient contact force. However, the present invention is not limited thereto. For example, the number of the support portions 486 each of which the projection 488 is provided on may be one or may be three or more. The support portions 486 may be provided as necessary.

Referring to FIG. 7, each of the plate portions 47 of the present embodiment has two U-shaped portions 48. The U-shaped portions 48 of each of the plate portions 47 are arranged in the lateral direction. Each of the U-shaped portions 48 has a base 482 and two arms 484 and 486. Each of the bases 482 extends along the lateral direction. In each of the U-shaped portions 48, the arms 484 and 486 are located on opposite sides of the base 482 in the lateral direction, respectively, and extend upward from the base 482. In each of the U-shaped portions 48, one of the two arms 484 and 486, or the arm 486, has the projection 488 and works as the aforementioned support portion 486.

Referring to FIG. 5, each of the mating plate portions 77 has the two connection portions 78 which correspond to the U-shaped portions 48, respectively. Under the mated state, each of the connection portions 78 is received between the two arms 484 and 486 of the corresponding U-shaped portion 48 and is brought into contact with the projection 488. The plate portion 47 of the present embodiment is brought into contact with the mating plate portion 77 in a well-balanced manner. However, the present invention is not limited thereto. For example, the arm 484 may work as a support portion instead of the arm 486 or in addition to the arm 486. Thus, in each of the U-shaped portions 48, at least one of the two arms 484 and 486 may have the projection 488. Each of the projections 488 may project outward in the lateral direction or may project inward in the lateral direction.

The structure of the plate portion 47 and the structure of the mating plate portion 77 are not limited to those of the present embodiment, provided that the plate portion 47 and the mating plate portion 77 can be reliably brought into contact with each other. For example, the U-shaped portions 48 may be connected to each other or may be apart from each other in the lateral direction. The number of the U-shaped portions 48 of each of the plate portions 47 may be one or may be three or more. The U-shaped portions 48 may be provided as necessary.

Referring to FIG. 5, under the mated state of the present embodiment, a gap 18 is formed between the plate portion 47 and the mating plate portion 77 in a plane perpendicular to the pitch direction. The gap 18 has a width which is smaller than any of the thickness TP of the plate portion 47 and the thickness TP of the mating plate portion 77. In detail, the gap 18 has a predetermined size in a direction perpendicular to another direction along which the gap 18 extends. This predetermined size of the gap 18 is smaller than the thickness TP throughout the gap 18. The thus-formed gap 18 does not substantially degrade the electromagnetic shielding function of the plate portion 47 and the mating plate portion 77. In addition, because the gap 18 is allowed to be formed, the plate portion 47 and the mating plate portion 77 can be reliably brought into contact with each other regardless of manufacturing tolerance.

Referring to FIG. 1, the present embodiment can be further variously modified in addition to the already described various modifications. As previously described, the arrangement and the number of the first terminals 32 of the present invention are not specifically limited. However, each of the first terminals 32 is preferred to be apart from the other first terminal 32 and the second terminal 34 with a ground terminal located therebetween. For example, the connector 12 may comprise two of the first terminals 32 which are arranged in the lateral direction. In this instance, a ground terminal may be provided between these two first terminals 32.

What is claimed is:

1. A connector assembly comprising a connector and a mating connector, wherein:

the connector and the mating connector are mateable with each other along an upper-lower direction;

the connector comprises a housing, a first terminal, a second terminal and a shield portion;

the housing has a holding portion;

the holding portion holds the first terminal, the second terminal and the shield portion;

the shield portion is located between the first terminal and the second terminal in a pitch direction perpendicular to the upper-lower direction;

the mating connector comprises a first mating terminal, a second mating terminal and a mating shield portion;

the mating shield portion is located between the first mating terminal and the second mating terminal in the pitch direction;

under a mated state where the connector and the mating connector are mated with each other, the first terminal and the first mating terminal are connected to each other, and the second terminal and the second mating terminal are connected to each other;

one of the shield portion and the mating shield portion has a plate portion, and a remaining one of the shield portion and the mating shield portion has a mating plate portion;

at least the plate portion has a projection;

the projection projects in a lateral direction perpendicular to both the upper-lower direction and the pitch direction;

under the mated state, a position of the plate portion is equal to or overlaps with another position of the mating plate portion in the pitch direction, and the projection is in contact with the mating plate portion in the lateral direction;

the shield portion has an armor;

the armor projects outward from the holding portion in the lateral direction; and the armor extends upward to a position which is same as or above a position of an upper end of the first terminal and which is same as or above a position of an upper end of the second terminal.

2. The connector assembly as recited in claim 1, wherein:

the armor has an upper end portion, a side end portion and a coupling portion;

the upper end portion extends along the lateral direction;

the side end portion extends along the upper-lower direction;

the coupling portion couples the upper end portion and the side end portion to each other; and the coupling portion projects from the holding portion in a plane perpendicular to the pitch direction.

3. The connector assembly as recited in claim 1, wherein:

the plate portion has a support portion;

the support portion is resiliently deformable and supports the projection; and the projection is brought into contact with the mating plate portion in accordance with resilient deformation of the support portion under the mated state.

4. The connector assembly as recited in claim 1, wherein the first terminal is a terminal for transmitting high frequency signals.

5. The connector assembly as recited in claim 1, wherein:

the shield portion has the plate portion;

the mating shield portion has the mating plate portion;

the plate portion has two U-shaped portions;

the U-shaped portions are arranged in the lateral direction;

each of the U-shaped portions has a base and two arms;

each of the bases extends along the lateral direction;

in each of the U-shaped portions, the arms are located at opposite sides of the base in the lateral direction, respectively, and extend upward from the base;

at least one of the two arms of each of the U-shaped portions has the projection;

the mating plate portion has two connection portions which correspond to the U-shaped portions, respectively;

the connection portions are arranged in the lateral direction; and under the mated state, each of the connection portions is received between the two arms of a corresponding one of the U-shaped portions and is bought into contact with the projection.

6. The connector assembly as recited in claim 1, wherein:

under the mated state, a gap is formed between the plate portion and the mating plate portion in a plane perpendicular to the pitch direction; and the gap has a width which is smaller than any of a thickness of the plate portion and another thickness of the mating plate portion.

7. The connector assembly as recited in claim 1, wherein:

the connector comprises a shell;

the shell has a peripheral wall and a lower plate;

the peripheral wall is apart from the holding portion and encloses the holding portion in a plane perpendicular to the upper-lower direction;

the lower plate extends between the peripheral wall and the holding portion; and the shield portion is formed integrally with the shell.

* * * * *